Feb. 6, 1923. 1,444,424.
J. H. NEDER.
HEADLIGHT DEFLECTOR FOR MOTOR VEHICLES.
FILED AUG. 26, 1921. 2 SHEETS—SHEET 1.
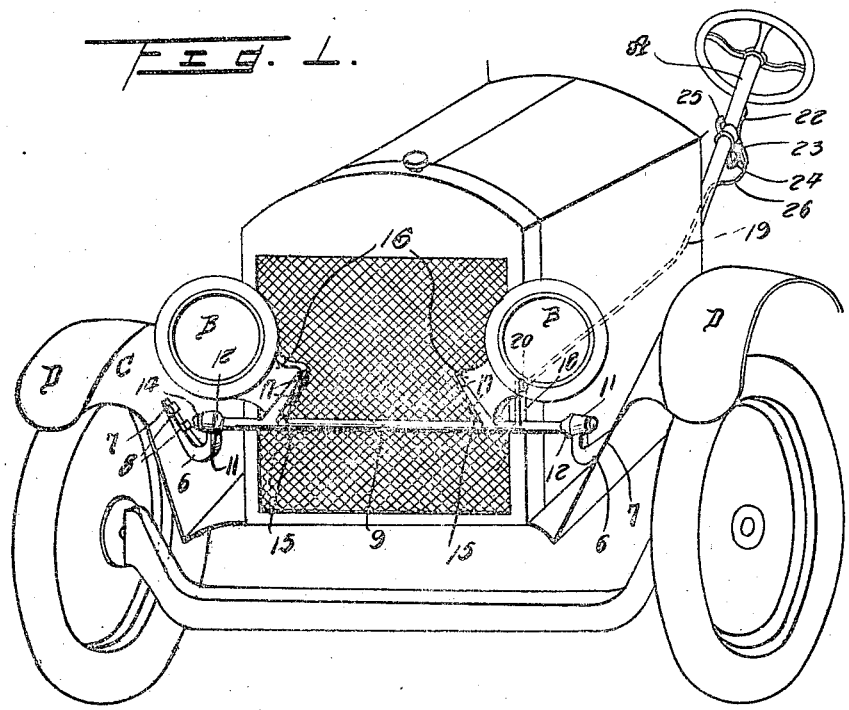
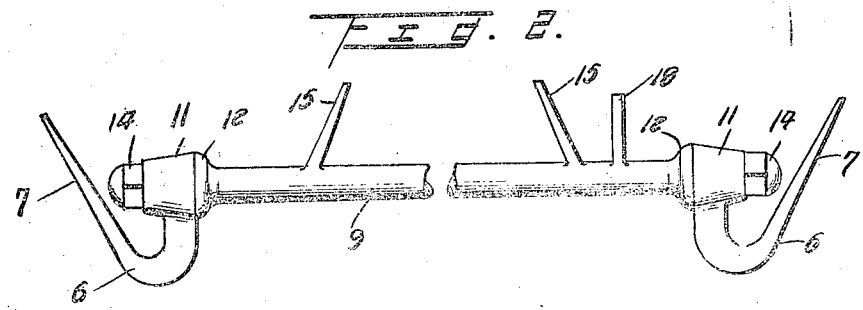
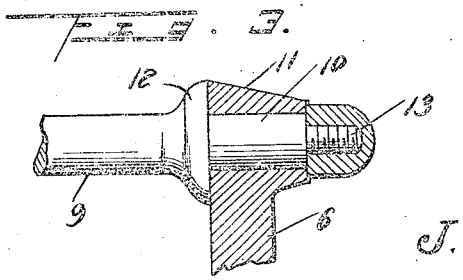
Inventor
J. H. Neder
By
Attorney Feb. 6, 1923.
J. H. NEDER.
HEADLIGHT DEFLECTOR FOR MOTOR VEHICLES.
FILED AUG. 26, 1921.
1,444,424.
2 SHEETS—SHEET 2.
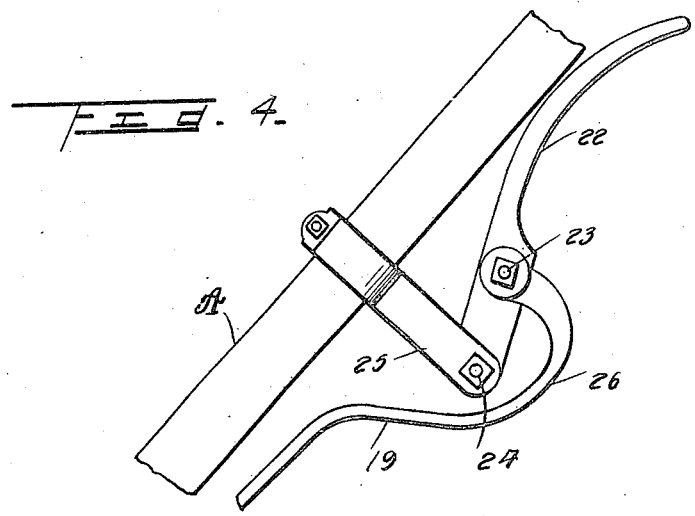
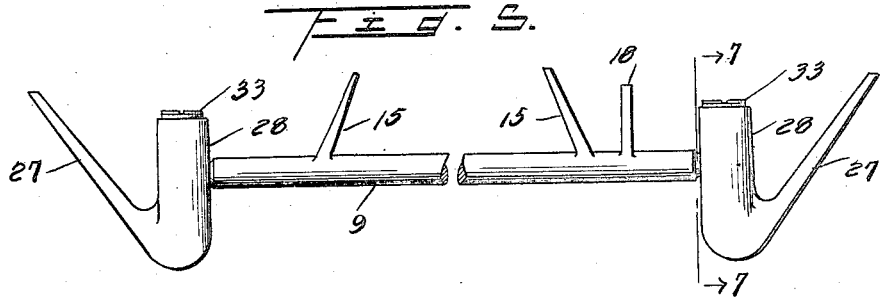
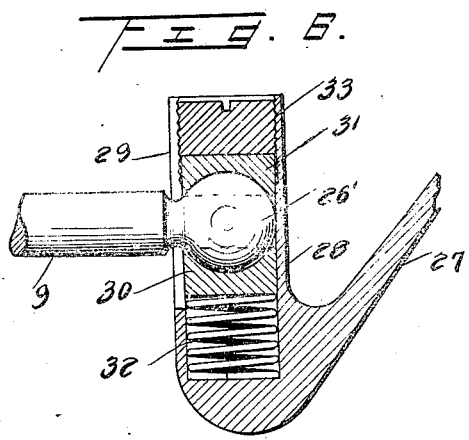
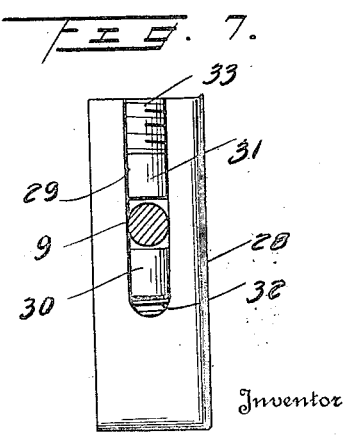
Inventor
J. H. Neder
By
Attorney Patented Feb. 6, 1923.

1,444,424

UNITED STATES PATENT OFFICE.

JOHN H. NEDER, OF BAKER, OREGON.

HEADLIGHT DEFLECTOR FOR MOTOR VEHICLES.

Application filed August 26, 1921. Serial No. 495,484.

*To all whom it may concern:*

Be it known that I, JOHN H. NEDER, a citizen of the United States, residing at Baker, in the county of Baker and State of Oregon, have invented certain new and useful Improvements in Headlight Deflectors for Motor Vehicles; and I do hereby declare the following to be a full, clear, and exact description of the invention, such as will enable others skilled in the art to which it appertains to make and use the same.

This invention relates to a headlight construction for vehicles particularly of the self-propelled type.

One important object is to provide means whereby vehicle headlights may be adjustably mounted so as to be operable to deflect their light rays from the horizontal to the road to avoid the glare therefrom inconveniencing an approaching driver.

Another object is to provide a mounting for headlights which is turnable on a horizontal axis and is adapted to be journaled from automobile fenders and operable by means controlled from a point adjacent to the steering wheel.

Additional objects and advantages will appear hereinafter from the description following of one practical embodiment illustrated in accompanying drawings.

In said drawings:—

Fig. 1 is a perspective view of the improved headlight construction in place on an automobile;

Fig. 2 is an elevation of the mounting member employed;

Figure 3 is an enlarged detail of one end of the mounting member and its bearing bracket, the latter being shown in section.

Figure 4 is an enlarged detail illustrating the operating lever and its fastening;

Figure 5 is an elevation of a modified form of mounting member;

Figure 6 is a detail view partly in longitudinal section illustrating the support of said mounting member, and Figure 7 is a sectional view on line 7—7 of Figure 5.

Referring specifically to the drawings, an automobile of conventional form is shown to illustrate an application of the invention and thereof A is the steering post or column, B the headlights or lamps, and C the inwardly and downwardly inclined walls of the front wheel fenders D.

Brackets or bearings 6 of any suitable construction have inclined attaching arms 7 bolted or otherwise secured at 8 to said walls C. A mounting or shaft 9 has trunnions 10 which are journaled in sleeves 11 of bearings 6. Annular abutment ribs 12 on shaft 9 abut the inner faces of the sleeves 11. Screw threaded shanks 13 extend from the trunnions 10 and receive nuts 14 which engage sleeves 11 on the opposite side to said abutments 12.

Said lamps B are mounted on shaft 9 in any suitable manner and the means will differ in practice according to the particular automobile equipped. In this instance arms 15 are provided integral with the shaft and extend angularly therefrom and are fastened to studs 16 on said lamps B by means of machine screws 17.

A crank arm 18 preferably integral with shaft 9 projects laterally therefrom and a draw rod or pitman 19 is joined thereto by a horizontal pivot at 20. Rod 19 is disposed for the most part within the hood and is operable from a point within reach of a seated driver as from steering post A.

The parts are normally held with the lenses of the lamps B vertical as usual in any desired way. To this end rod 19 is pivoted a lever 22 at 23 which in turn is pivoted at 24 to a bracket 25 mounted for instance on the steering post A. Rod 19 has a deflected portion 26 to enable disposition of its pivot 23 between pivot 24 and post A normally to give an eccentric effect so that lever 22 and rod 19 will be self-locking.

Lamps B in use are normally disposed to project the light rays horizontally, the shaft 9 being maintained in proper position relatively thereto by lever 22. Should a vehicle approach, lever 22 may be swung away from the steering wheel to tilt the lamps B to project the light rays onto the ground so that the glare therefrom will not inconvenience or annoy the driver of such vehicle. When said vehicle has passed, lever 22 may be released and swung to normal position, which will return the lamps B and associated parts to normal position.

Various changes in the details within the spirit and scope of appended claims may be resorted to. One such change is illustrated in Figs. 3, 4, and 5 and concerns the mounting of shaft 9 from fender walls C. Aside from the provision of balls 26 one at each end of shaft 19 the shaft and connected parts in this form are the same as in the first form and have the same reference numerals applied thereto. The brackets or bearings used in place of those at 6 have arms 27 to be bolted or riveted to the fender walls C. Upstanding cylinders 28 are integral with arms 27 and said balls 26 are disposed in the cylinders. Said cylinders have elongated slots 29 in which said modified shaft is disposed and may slide in positioning it. A socket engages each ball and consists of sections 30 and 31 removably disposed in the cylinders. Said socket sections have spherical surfaces to contact with balls 26. Springs 32 removably mounted in the cylinders 28 cushion sections 30 while nuts 33 are threaded into the upper ends of said cylinders and bear against sections 31. Through the adjustment of nuts 33 the height of the modified shaft and lamps thereon can be controlled since the springs 32 urge sections 30 upwardly. In this modified form, the shaft is free to turn axially horizontally on the balls and sockets when the lever 22 or equivalent is actuated.

What is claimed is:—

In a headlight mechanism, a lamp, a bracket having an inclined attaching arm, a standard rising substantially vertically from the lower end of the attaching arm, a mounting shaft for the lamp journaled in said standard, an arm extending upwardly from the shaft on the side of the standard opposite to the attaching arm and being inclined upwardly and away from the standard, and said lamp being secured to the second arm and disposed over and out of contact with said standard.

In testimony whereof I affix my signature in presence of two witnesses.

JOHN H. NEDER.

Witnesses:
S. O. CORRELL,
ERNESTINE HORNER.